(12) United States Patent
Yamada et al.

(10) Patent No.: US 7,701,624 B2
(45) Date of Patent: Apr. 20, 2010

(54) IMAGE-FORMING DEVICE FOR CORRECTING PRINTING CHARACTERISTICS

(75) Inventors: Ryuji Yamada, Oogaki (JP); Seiji Yoshida, Mizuho (JP); Masashi Ueda, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1292 days.

(21) Appl. No.: 11/020,111

(22) Filed: Dec. 27, 2004

(65) Prior Publication Data

US 2005/0141000 A1    Jun. 30, 2005

(30) Foreign Application Priority Data

Dec. 26, 2003    (JP)    ............... 2003-434235

(51) Int. Cl.
*H04N 1/46* (2006.01)
*H04N 1/00* (2006.01)
*G03F 3/08* (2006.01)
*G03G 15/00* (2006.01)

(52) U.S. Cl. ............... 358/504; 358/406; 358/519; 399/8; 399/43

(58) Field of Classification Search ............ None
See application file for complete search history.

(56) References Cited

U.S. PATENT DOCUMENTS

| 6,160,968 | A | * | 12/2000 | Noda ............ 399/8 |
| 2002/0085235 | A1 | * | 7/2002 | Degani et al. ........... 358/3.06 |
| 2002/0149799 | A1 | * | 10/2002 | Hayashi ............... 358/406 |
| 2004/0136025 | A1 | * | 7/2004 | Moriyama et al. ....... 358/1.14 |

FOREIGN PATENT DOCUMENTS

JP    A 2003-202713    7/2003

* cited by examiner

*Primary Examiner*—Twyler L Haskins
*Assistant Examiner*—Barbara D Reinier
(74) *Attorney, Agent, or Firm*—Oliff & Berridge, PLC (57) ABSTRACT

In a color laser printer, the printing density of images to be formed is corrected based on a correction values stored in a control memory, For each printing operation the printer determines whether the correction values stored in the control memory matches a value stored in a backup memory. If the correction values in the control memory does not match the correction values in the backup memory, the value of a number of printed pages A serving as the printing performance is incremented by one. If the number of printed pages A is greater than a reference performance number of sheets B pre-stored in memory, then the correction values in the control memory is copied to the backup memory, and the printing operation is executed. If a "Restore correction data" command is inputted, the contents of the backup memory are copied to the control memory.

19 Claims, 9 Drawing Sheets

IMAGE-FORMING DEVICE FOR CORRECTING PRINTING CHARACTERISTICS

BACKGROUND OF THE INVENTION

1. Field of the Invention

The present invention, relates. to an image-forming device capable of correcting printing characteristics using correction data; an image-forming system employing the image-forming device; and a method of updating correction data employed in the image-forming device.

2. Description of Related Art

In conventional image-forming devices, such as color laser printers, components of the device and the quality of the toner degrade over time. These degradations, along with changes in environmental conditions and the like, produce differences in colors, such as differences in printing density, between images intended to be rendered by the inputted image data and the actual images formed on the recording medium. In order to reduce these differences, there have been proposed image-forming devices for correcting printing characteristics through calibration.

In this type of image-forming device, such as that disclosed in Japanese unexamined patent application publication No. 2003-202713, a test pattern is printed as a reference image, and a density sensor is employed to detect printing densities in the printed test pattern. The image-forming device determines correction data based on the detection results and stores this correction data in a prescribed storage area.

SUMMARY OF THE INVENTION

However, due to changes in environmental conditions and the like over time, the correction data will not always remain a suitable value. For example, if calibration is performed before the image-forming device is completely warmed up, the correction data that is determined through this calibration may be suited for printing characteristics that are different than when the image-forming device has warmed up and is operating in its normal state. Accordingly, this correction data will not correct the printing characteristics suitably when the image-forming device is printing in the normal state.

Hence, appropriate correction data is often not found through the calibration process, leaving the user dissatisfied with the printing results. In such a case, the user must repeat the calibration to obtain satisfactory printing results. Sometimes, the user must repeat this calibration numerous times until satisfied.

However, in some cases the user cannot obtain truly satisfactory printing results, even after performing the calibration numerous times, and may wish to revert to printing results prior to the current calibration that were largely satisfactory. Hence, after the image-forming device has performed calibration, it is desirable to restore correction data to the state prior to this calibration based on user input.

In view of the foregoing, it is an object of the present invention to provide an image-forming device capable of correcting printing characteristics by restoring and using correction data that have achieved largely satisfactory printing results.

In order to attain the above and other objects, the present invention provides an image-forming device, including: an image-forming portion; a memory; a correction data generating portion; a printing control portion; a monitoring portion; a backup, storage portion; and a restoring portion. The image-forming portion forms images based on image data on a recording medium. The memory has a storage area and a backup storage area. The correction data generating portion generates, upon receipt of a calibrate command, a set of correction data based on printing density formed by the image-forming portion based on the image data and writes the generated set of correction data in the storage area. The set of correction data corresponds to printing characteristics of the image-forming portion. The printing control portion performs image-forming operation to correct image data, indicative of an image desired to be formed, based on the set of correction data stored in the storage area and to control the image-forming portion to form the desired image on the recording medium based on the corrected image data. The monitoring portion monitors a performance value, indicative of a degree of performance with which the printing control portion executes its image-forming operation by using the correction data stored in the storage area. The backup storage portion writes the set of correction data stored in the storage area into the backup storage area when the performance value monitored by the monitoring portion exceeds a reference performance value, The restoring portion restores, in response to a restore command, the set of correction data that is stored in the backup storage area back into,the storage area.

According to another aspect, the present invention provides an image-forming system, including: an image-forming device; a memory; a correction data generating portion; a printing control portion; a monitoring portion; a backup storage portion; and a restoring portion. The image-forming device includes an image-forming portion that forms images based on image data on a recording medium. The memory has a storage area and a backup storage area. The correction data generating portion generates, upon receipt of a calibrate command, a set of correction data based on printing density formed by the image-forming portion based on the image data and writes the generated set of correction data in the storage area. The set of correction data corresponds to printing characteristics of the image-forming portion in the image-forming device. The printing control portion performs image-forming operation to correct image data, indicative of an image desired to be formed, based on the set of correction data stored in the storage area and to control the image-forming portion in the image-forming device to form the desired image on the recording medium based on the corrected image data. The monitoring portion monitors a performance value, indicative of a degree of performance with which the printing control portion executes its image-forming operation by using the correction data stored in the storage area. The backup storage portion writes the set of correction data stored in the storage area into the backup storage area when the performance value monitored by the monitoring portion exceeds a reference performance value. The restoring portion restores, in response to a restore command, the set of correction data that is stored in the backup storage area back into the storage area.

According to another aspect, the present invention provides a method of updating correction data used for correcting image data, based on which an image-forming device forms images on a recording medium. The method includes: generating, upon receipt of a calibrate command, a set of correction data based on printing density formed by an image-forming device based on image data, the set of correction data corresponding to printing characteristics of the image-forming device; writing the generated set of correction data in a storage area; performing image-forming operation to correct image data, indicative of an image desired to be formed, based on the set of correction data stored in the storage area and to control the image-forming device to form the desired image on the recording medium based on the corrected image data; monitoring a performance value indicative of a degree of performance with which the image-forming device performs its image-forming operation by using the correction data stored in the storage area; writing the set of correction data stored in the storage area into a backup storage area other than the storage area when the monitored performance value exceeds a reference performance value; and restoring, in response to a restore command, the set of correction data that is stored in the backup storage area back into the storage area.

According to another aspect, the present invention provides a storage medium storing, in a manner readable by a computer, a program of updating correction data used for correcting image data, based on which an image-forming device forms images on a recording medium. The program includes: a program of generating, upon receipt of a calibrate command, a set, of correction data based on printing density formed by an image-forming device based on image data, the set of correction data corresponding to printing characteristics of the image-forming device; a program of writing the generated set of correction data in a storage area; a program of performing image-forming operation to correct image data, indicative of an image desired to be formed, based on the set of correction data stored in the storage area and to control the image-forming device to form the desired image on the recording medium based on the corrected image data: a program of monitoring a performance value indicative of a degree of performance with which the image-forming device executes its image-forming operation by using the correction data stored in the storage area: a program of writing the set of correction data stored in the storage area into a backup storage area other than the storage area when the monitored performance value exceeds a reference performance value; and a program of restoring, in response to a restore command, the set of correction data that is stored in the backup storage area back into the storage area.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENT

An image-forming device according to a preferred embodiment of the present invention will be described while referring to the accompanying drawings.

In the following description, the expressions "front", "rear", "upper", "lower", "right", and "left" are used to define the various parts when the image-forming device is disposed in an orientation in which it is intended to be used.

Figure 1:
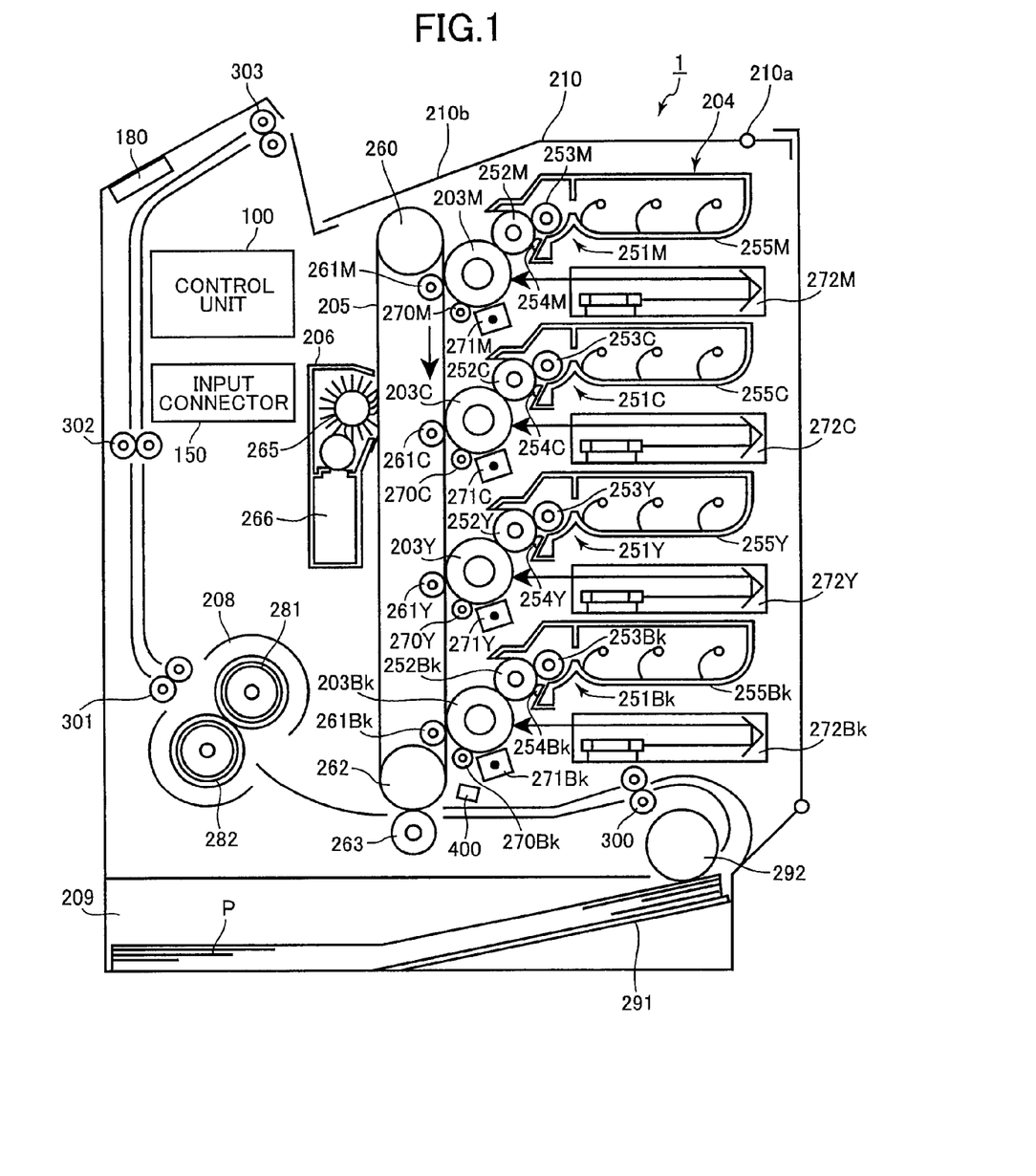
FIG. 1 is a cross-sectional view showing the general construction of a printer 1 according to the preferred embodiment.

FIG. 1 is a side cross-sectional view showing the general structure of a color laser printer 1 according to the present embodiment. The printer 1 shown in FIG. 1 includes a control unit 100, a visible image forming unit 204, an intermediate transfer member 205, a fixing unit 208, a paper supply unit 209, and a paper discharge tray 210b.

For each visible image forming step using toner of the colors magenta (M), cyan (C), yellow (Y), and black (Bk), the visible image forming unit 204 includes photosensitive drums 203 (203M, 203C, 203Y, and 203Bk); chargers 271 (271M, 271C, 271Y, and 271Bk); exposure devices 272 (272M, 272C, 272Y, and 272Bk): developing units 251 (251M, 251C, 251Y, and 251Bk); and cleaning rollers 270 (270M, 270C, 270Y, and 270Bk).

Figure 2:
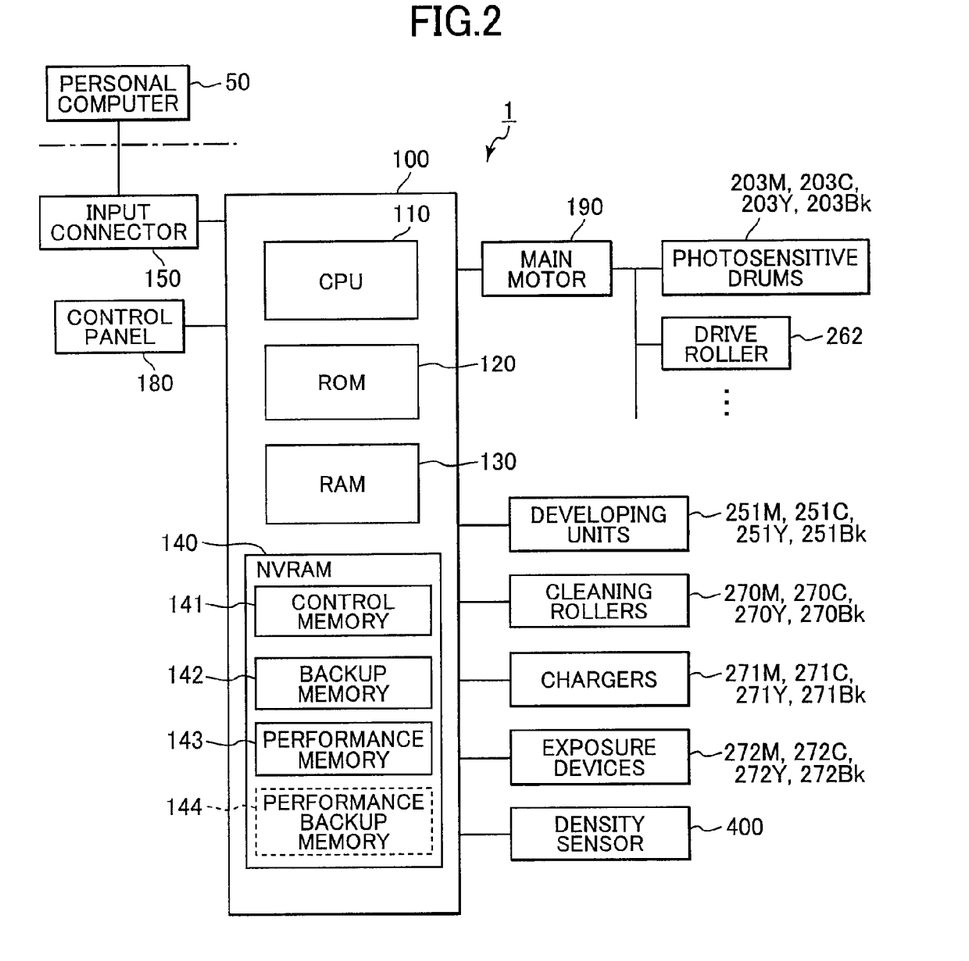
FIG. 2 is a block diagram showing the structure of the printer 1 of FIG. 1.

As shown in FIG. 2, the control unit 100 controls a main motor 190 to drive rotating members, such as the photosensitive drums 203 and a drive roller 262 for driving the intermediate transfer member 205. The developing units 251 and other components are also connected to the control unit 100, which controls the power source and signal input and output to these components.

Next, these components will be described in greater detail.

The photosensitive drums 203 are configured of a cylindrical base formed of an aluminum material and a positively charged photosensitive layer formed over the surface thereof. The aluminum base serves as an electrically-grounded layer. The photosensitive drums 203 are driven by the main motor 190 to rotate in the counterclockwise direction in FIG. 1.

The chargers 271 are Scorotron type chargers. The chargers 271 are disposed in confrontation with the bottom surface of the photosensitive drums 203, but not in contact therewith, for applying a positive charge to the surface of the photosensitive drums 203.

The exposure devices 272 are configured of laser scanning units well known in the art. The exposure devices 272 are stacked vertically with the corresponding developing units 251 being located therebetweeen and are aligned horizontally with the photosensitive drums 203. The exposure devices 272 irradiate the surfaces of the aphotosensitive drums 203 with laser light based on exposure signals inputted from the control unit 100 at a position downstream, of the chargers 271 in the rotational direction of the photosensitive drums 203. As a result, an electrostatic latent image for each color is formed on the surface of each photosensitive drum 203.

The developing units 251 are configured of developer cases 255 (255M, 255C, 255Y, and 255Bk) for accommodating toner; developing rollers 252 (252M, 252C, 252Y, and 252Bk); supply rollers 253 (253M, 253C, 253Y, and 253Bk); and thickness regulating blades 254 (254M, 254C, 254Y, and 254Bk).

The developing rollers 252 are configured of cylindrical bases formed of an electrically conductive silicone rubber or urethane rubber coated with a resin or rubber layer including fluorine.

The supply rollers 253 are electrically conductive sponge rollers, and are configured to contact the developing rollers 252 with pressure through the elastic force of the sponge material. The supply rollers 253 are configured of a foam material formed of an appropriate material, such as an electrically conductive silicone rubber, EPDM, or urethane rubber.

The base-end of the thickness regulating blades 254 is formed of a stainless steel plate or the like fixed to the developer cases 255, while the free end is formed of an insulating silicone rubber or an insulating resin or rubber containing fluorine. The free end of the thickness regulating blades 254 contacts the developing rollers 252 with pressure from the bottom thereof.

The toner accommodated in the developer cases 255 is a positively charged, nonmagnetic, single-component developer. The toner includes base toner particles that are formed by adding an additive, such as coloring agent (carbon black, for example that is well known in the art) and a charge-controlling agent or charge-controlling resin such as nigrosine, triphenylmethane, or quaternary ammonium salt, to a styrene-acrylic resin formed in a spherical shape through suspension polymerization. Toner of the colors magenta, cyan, yellow, and black are accommodated in the respective developer cases 255M, 255C, 255Y, 255Bk.

The toner is positively charged when supplied from the supply rollers 253 to the developing rollers 252, and is formed in a thin layer of uniform thickness on the developing rollers 252 by the thickness regulating blades 254. At the contact point between the developing rollers 252 and photosensitive drums 203, the developing units 251 develop an electrostatic latent image, having a positive polarity and formed on the photosensitive drums 203, with a positively charged toner by the reverse developing method.

The cleaning rollers 270 are configured of rollers formed of electrically conductive sponges or other elastic materials and are disposed upstream of the chargers 271 in the rotational direction of the photosensitive drums 203 so as to slide against the surface of the photosensitive drums 203. A power source (not shown) applies the cleaning rollers 270 with a voltage with a negative polarity that is opposite to the polarity of the toner. The effect of the frictional force on the photosensitive drums 203 and the electric field generated by the voltage removes toner from the photosensitive drums 203. The color laser printer 1 employs a cleanerless developing system. Accordingly, during a prescribed cycle after a developing step is completed, the cleaning rollers 270 are charged with a reverse polarity so as to return toner temporarily removed from the photosensitive drums 203 back to the photosensitive drums 203. This toner is then collected by the developing rollers 252 and returned to the developing units 251 of the respective color.

The intermediate transfer member 205 has a belt shape formed from a conductive sheet of polycarbonate, polyimide, or the like. As shown in FIG. 1, the intermediate transfer member 205 is looped around two drive rollers 260 and 262. Intermediate transfer rollers 261 (261M, 261C, 261Y, and 261Bk) are disposed near positions opposing the respective photosensitive drums 203. The intermediate transfer member 205 circulates in a loop elongated vertically, as shown in FIG. 1, such that the surface side of the intermediate transfer member 205 opposing the photosensitive drums 203 moves vertically downward.

A prescribed voltage is applied to the intermediate transfer rollers 261 for transferring a toner image formed on the photosensitive drums 203 to the intermediate transfer member 205.

A density sensor 400 is disposed at a position opposing the intermediate transfer member 205 after the intermediate transfer member 205 has passed the photosensitive drum 203Bk. The density sensor 400 is an optical sensor that detects a toner image formed on the intermediate transfer member 205 and includes four sensors arranged in a direction orthogonal to the movement of the intermediate transfer member 205 for detecting the density of the four colors magenta, cyan, yellow, and black.

A secondary transfer roller 263 is disposed at a position in which the toner image is transferred to a paper P. In other words, the secondary transfer roller 263 opposes the intermediate transfer member 205 at the drive roller 262 positioned on the bottom end of the intermediate transfer member 205. A prescribed potential is applied to the secondary transfer roller 263. As a result, a four-color toner image carried on the surface of the intermediate transfer member 205 is transferred onto the paper P passing between the drive roller 262 and secondary transfer roller 263.

As shown in FIG. 1, a cleaning device 206 is disposed on the side of the intermediate transfer member 205 opposite the side that opposes the photosensitive drums 203. The cleaning device 206 includes a scraping member 265, and a case 266. Any toner remaining on the surface of the intermediate transfer member 205 is scraped off by the scraping member 265 and collected in the case 266.

The paper supply unit 209 is disposed in the bottommost section of the printer 1 and includes a tray 291 for accommodating the paper P, and a pickup roller 292 for feeding the paper P. The pickup roller 292 is driven to feed the paper P at a prescribed timing in an imaging forming step performed by the exposure devices 272, developing units 251, photosensitive drums 203, and intermediate transfer member 205. The paper P supplied from the paper supply unit 209 is conveyed by a pair of conveying rollers 300 to a pressure contact point between the intermediate transfer member 205 and the secondary transfer roller 263.

The fixing unit 208 is configured of a first heating roller 281 and a second heating roller 282. After a four-color toner image is transferred onto the paper P, the paper P is interposed between and conveyed by the heating rollers 281 and 282. The heating rollers 281 and 282 apply heat and pressure to the paper P to fix the toner image thereon.

An upper cover 210 is disposed on the topmost portion of the printer 1. The upper cover 210 is capable of rotating about a shaft 210a. Part of the upper cover 210 serves as the paper discharge tray 210b. The paper discharge tray 210b is disposed on the discharge side of the fixing unit 208 and is configured to accommodate paper P discharged from the fixing unit 208 and conveyed out of the printer 1 by pairs of conveying rollers 301, 302, and 303.

An input connector 150 is provided on the side surface of the printer 1. As shown in FIG. 2, the input connector 150 is connected to the control unit 100 and is also connected to a personal computer 50. In this example, the personal computer 50 inputs density data as image data to the printer 1 via the input connector 150. The density data indicates print density of an image desired to be formed by the laser printer 1, and indicates a number in a range of 0% to 100%, in this example, for each color of cyan, magenta, yellow, and black. Hence, the input connector 150 serves to transfer signals, including density data, between the control unit 100 and the personal computer 50.

As shown in FIG. 2, the control unit 100 is configured of a microcomputer well known in the art that includes a CPU 110, a ROM 120, a RAM 130, and a nonvolatile RAM (NVRAM) 140. The control unit 100 performs various processes for components connected thereto according to programs stored in the ROM 120. The programs include the programs of a calibration process, an automatic saving process, a correction data restoring process, a user-instruction-based save process, which will be described later with reference to FIGS. 3, 5, 6(a), and 6(b).

Allocated in the NVRAM 140 are a control memory 141 serving as a memory area for storing four colors worth of correction data H that is presently being used for correcting density data; a backup memory 142 serving as a back up memory area for storing four colors worth of correction data R that is proven as satisfactory; and a performance memory 143 for storing a number of printed pages A for the number of pages that have been printed using the presently-being-used correction data H stored in the control memory 141.

The correction data H includes values that are determined through the calibration process of FIG. 3 described later.

Figure 4A:
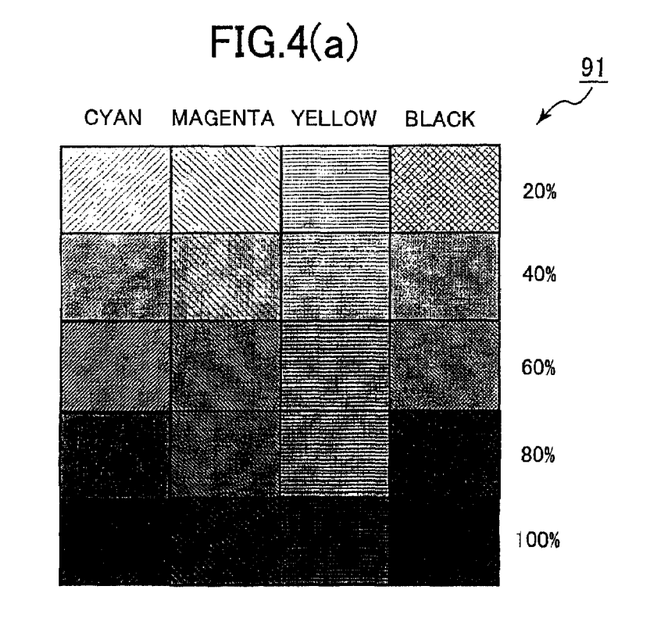
FIG. 4(a) is an explanatory diagram showing a test pattern.
Figure 4B:
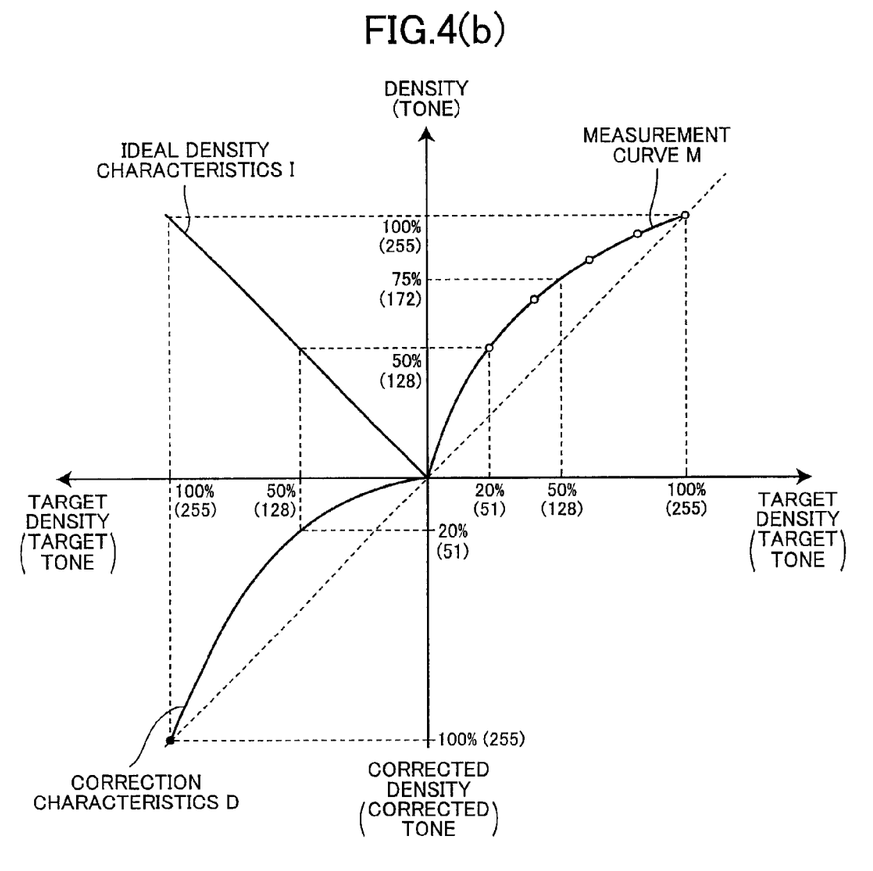
FIG. 4(b) illustrates how to create correction data.
Figure 4C:
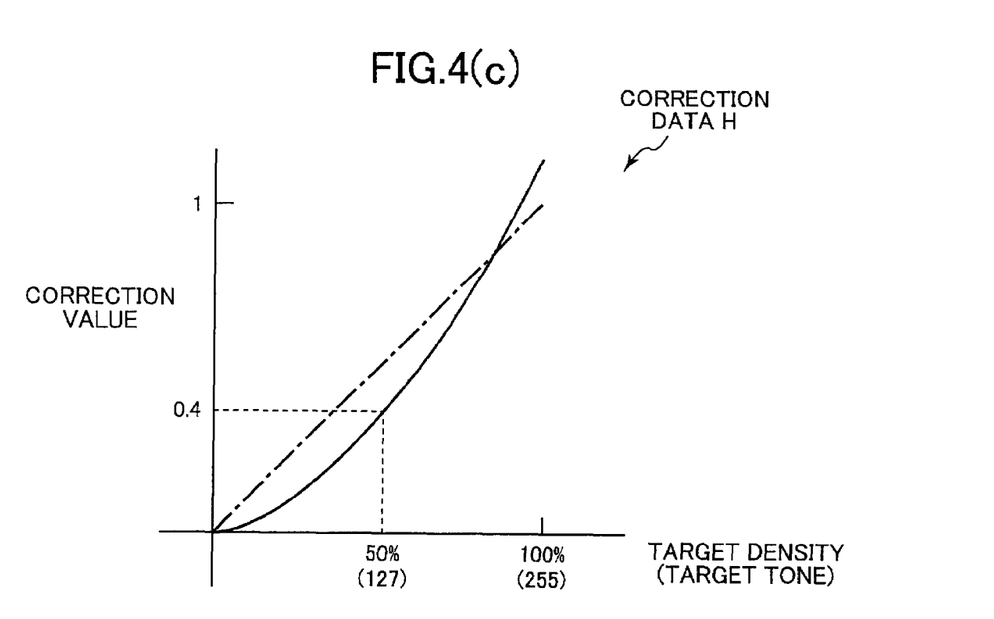
FIG. 4(c) illustrates correction data according to the preferred embodiment.

FIG. 4(c) is a graph showing a set of correction data H for one color depicted in a curve that is divided into units of 1/256. The horizontal axis of the graph represents the range from 0 to 100% of the target density for images to be formed by density data, while the vertical axis represents a correction coefficient to be used for correcting the density data inputted from the personal computer 50. Correction coefficients for the target density at each division are stored in the memory 141.

It is assumed that the laser printer 1 has such printing characteristics that the laser printer 1 actually prints out an image of print density of 75% in correspondence with density data of 50% and actually prints out an image of print density of 50% in correspondence with density data of 20%, and that the laser printer 1 should ideally print out an image of print density of 50% in correspondence with density data of 50%. In such a case, the correction coefficient has such a value (0.4, for example) in correspondence with target density of 50% that will be used for reducing the density data of 50% to a lower value of 20% that will in turn control the laser printer 1 to actually print out an image of the print density of 50%.

A copy of the correction data H is saved-in the backup memory 142 as the proven correction data R when the correction data H is proven as satisfactory through the automatic saving process of FIG. 5 or through the user-instruction-based saving process of FIG. 6(b) as will be described later.

It is noted that each of the memories 141 and 142 has a memory area of an amount that is capable of storing one set of correction data H, which includes coefficient values for all the target values of 0 to 100%.

A control panel 180 is also provided on the top surface of the printer 1 and is connected to the control unit 100. While not shown in the drawings, the control panel 180 is configured of a plurality of input buttons for specifying operations and inputting data, and a display screen for displaying text. When the control unit 100 detects input from the input buttons, the control unit 100 displays text data on the display screen. The user operates the input buttons on the control panel 180 to display various commands, setting conditions, and the like for the printer 1 on the display screen, enabling the user to input the displayed commands and setting conditions into the control unit 100. Commands that the user can input through the control panel 180 include: a "Calibrate" command for generating correction data; a "Restore correction data" command for restoring the proven correction data R in the backup memory 142 back to the control memory 141 as presently-being-used correction data H; and a "Save correction data" command for saving the presently-being-used correction data H stored in the control memory 141 in the backup memory 142.

Next will be described how the printer 1 prints images.

First, the chargers 271 apply a uniform charge to the photosensitive surfaces of the photosensitive drums 203.

The control unit 100 generates exposure signals by converting density data, indicative of densities desired to be formed, through a predetermined converting process, and outputs the exposure signals to the exposure devices 272.

The corresponding photosensitive drums 203 are exposed by the exposure devices 272 according to the exposure signals for the respective colors magenta, cyan, yellow, and black, forming electrostatic latent images on the photosensitive drums 203.

The developing units 251 deposit magenta toner, cyan toner, yellow toner, and black toner on the photosensitive drums 203 to develop the latent images formed on the photosensitive layer of the photosensitive drums 203 in the respective magenta, cyan, yellow, and black colors. Subsequently, the toner images formed in magenta, cyan, yellow, and black are transferred temporarily to the surface of the intermediate transfer member 205 by the intermediate transfer rollers 261.

During this process, the toner images in, each color are formed at slightly staggered or shifted time intervals to account for the speed of the intermediate transfer member 205 and the positions of the photosensitive drums 203, so as to superimpose the toner images of all the four colors on the intermediate transfer member 205.

Toner remaining on the photosensitive drums 203 after this transfer process is collected and temporarily held by the cleaning rollers 270.

The four-color toner image formed on the intermediate transfer member 205 is subsequently transferred onto the paper P supplied from the paper supply unit 209 at the position of contact between the secondary transfer roller 263 and the intermediate transfer member 205. The paper P is then conveyed to the fixing unit 208, where the toner image is fixed thereon, and subsequently discharged onto the paper discharge tray 210b by the conveying rollers 301, 302, and 303, thereby completing the formation of a four-color image.

Next, a calibration process performed by the control unit 100 will be described with reference to the flowchart in FIG. 3.

The control unit 100 performs the calibration process prior to the color image printing operation described above when the user inputs a "Calibrate" command-via the control panel 180 for adjusting the printing density for printed colors.

In S510 the control unit 100 performs calibration to determine the correction data H to be stored in the control memory 141. This calibration is achieved with the following process.

First, the control unit 100 performs the same exposure and developing process described above in the printing operation to form a toner image such as a color correction pattern 91 shown in FIG. 4(a). The color correction pattern 91 for each of the four colors magenta, cyan, yellow, and black has image areas ranging imprinting density from 20 to 100% in increments of 20%, for example.

More specifically, the control unit 100 generates density values of 20%, 40%, 60%, 80%, and 100% for each color. The control unit 100 generates exposure signals by converting the density values through the predetermined converting process, and outputs the exposure signals to the exposure devices 272. As a result, the color correction pattern 91 is formed on the intermediate transfer member 205 in each color.

The density sensor 400 measures the actual color density of toner images in the color correction pattern 91 as the color correction pattern 91 formed on the intermediate transfer member 205 passes by the density sensor 400.

Since a voltage is not applied to the secondary transfer roller 263 at this time, the color correction pattern 91 formed on the intermediate transfer member 205 is not transferred onto the secondary transfer roller 263, but is merely recovered by the cleaning device 206.

Then, as shown in FIG. 4(b), a measurement curve M is determined for each color by interpolating the density values that are actually measured by the density sensor 400 for the target densities at 20% increments.

Then, for each color, a correction curve D is determined based on the measurement curve M and based on ideal printing characteristics I, with which the laser printer 1 is desired to print images. The correction curve D indicates, in correspondence with each target density value, a corrected density whose amount can control the printer 1 to print out the density the same as the subject target density.

Then, based on the correction curve D, a correction coefficient curve H is determined as shown in FIG. 4(c) as a conversion curve that indicates, in correspondence with each target density, a correction coefficient to be used for converting the target density value into the corrected density value on the correction curve D. In this way, a set of correction data H indicative of the correction coefficient curve is created.

It is again assumed that the measurement curve M shows that the laser printer 1 actually prints out print density of 75% in correspondence with density data of 50% and that the laser printer 1 actually prints out print density of 50% in correspondence with density data of 20% and that the laser printer 1 should ideally print out print density of 50% in correspondence with density data of 50%. In such a case, the correction curve D is determined to such a curve that reduces density data of 50% into density data of 20%. The correction coefficient curve H indicates a correction coefficient of 0.4 in correspondence with the target density of 50% in order to reduce the target density of 50% into the corrected density of 20%.

In S520 the control unit 100 stores the correction data H generated in S510 in the control memory 141. That is, it a set of correction data H has already been stored in the control memory 141, the newly-generated set of correction data H is written over the already-stored set of correction data H.

In S530 the number of printed pages A stored in the performance memory 143 is set to "0", and the process ends.

Hence, when a "Calibrate" command is inputted via the control panel 180, this calibration process is performed to update the correction data H stored in the control memory 141.

Next, a process for automatically saving the correction data H as proven correction data R in the backup memory 142 will be described with reference to the flowchart shown in FIG. 5.

This process is performed each time when printing one sheet worth of density data which is inputted from the personal computer 50.

In S550 the control unit 100 determines whether the correction data H stored in the control memory 141 matches the value of the correction data R already stored in the backup memory 142.

If the correction data H matches the correction data R (S550: YES), then the printing process is performed in S590.

During the printing process of S590, first, the control unit 100 corrects the inputted density data with using a correction coefficient that is stored in the control memory 141 in correspondence with the value of the density data, and converts the thus corrected density data into an exposure signal through the predetermined converting process, and outputs the exposure signal to the exposure devices 272.

However, if the correction data H in the control memory 141 does not match the correction data R in the backup memory 142 (S550: NO), then in S560 the number of printed pages A is incremented by one (1). Hence, the number of printed pages A serves as the performance value indicative of a degree how the user is satisfied with the printing results obtained based on the correction data H.

In S570 the control unit 100 determines whether the number of printed pages A is larger than a reference number of sheets B that has been pre-stored in memory (NVRAM 140, in this example).

If the number of printed pages A is greater than the reference number of sheets B (SS70: YES), then in S580 the control unit 100 copies, to the backup memory 142, the value of the correction data H stored in the control memory 141 as correction data R newly proven as satisfactory. As a result, the correction data R, which is already stored in-the backup memory 142 and which has been proven as satisfactory at the latest, is overwritten with the correction data H which is newly proven as satisfactory correction data R. Thus, the proven correction data R is updated.

However, if the number of printed pages A is less than or equal to the reference number of sheets B (S570: NO), then the control unit 100 skips S580 and advances directly to S590.

In S590 the control unit 100 performs the printing operation described above, and the process ends.

It is noted that the reference number of sheets B is previously set in the NVRAM 140 to a number of sheets determined to be a sufficiently large value (for example, 100 sheets), The reference number of sheets B is set by the user through operations on the control panel 180. It is proven in S570 that the correction data H that is presently being stored in the memory 141 satisfies the user when the user has been continuing using the subject correction data H to print images onto sheets of more than the reference number of sheets B (yes in S570).

Next, a correction data restoring process will be described with reference to the flowchart shown in FIG. 6(a).

This process is performed when the user inputs a "Restore correction data" command through operations on the control panel 180.

In S610 the control unit 100 determines whether the correction data H stored in the control memory 141 matches the correction data R stored in the backup memory 142.

If the correction data H matches the correction data R (S610: YES), the process ends since there is no need to overwrite the value in the control memory 141 with the value in the backup memory 142.

However, if the correction data H does not match the correction data R (S610: NO), then in S620 the control unit 100 copies the value of the correction data R stored in the backup memory 142 to the control memory 141. Thus, the correction data H already stored in the control memory 141 is overwritten with the proven correction data R.

In S630, the control unit 100 resets the number of printed pages A to zero (0), and the process ends.

After execution of this process, when a printing operation is executed, correction of printing density will be performed using the proven correction data a that has been stored in the backup memory 142 and that is now restored in the control memory 141.

Next, a save correction data process will be described with reference to the flowchart in FIG. 6(b).

This-process is performed when the user inputs a "Save correction data" command through operations on the control panel 180.

Through the process in S650 in the flowchart, the control unit 100 overwrites the correction data R already stored in the backup memory 142 with the value of the correction data H that is presently being stored in the control memory 141, thereby newly setting the value of the presently-being-used correction data H as the proven correction data R.

With the printer 1 having this construction, the correction data R stored in the backup memory 142 is updated by the correction data H when the number of printed pages A after performing calibration is determined to be sufficiently large by exceeding the reference number of sheets B.

By inputting a "Restore correction data" command, the user can restore the correction data R, which has been time-tested, so that printing density can be corrected with using the proven correction data R when forming images. Hence, in cases in which satisfactory results cannot be obtained after performing calibration numerous times, by inputting the "Restore correction data" command, the printing density can be corrected by the value of the proven correction data R in order to obtain images that are largely satisfactory.

Even before correction data has become sufficiently time-tested, when printing results presently obtained by the use of the correction data H are satisfactory, the user can input the "Save correction data" command in order to store, in the backup memory 142, the correction data H that is now known as satisfactory as the proven correction data R.

In one comparative example, it is assumed that the backup storage area were not provided in the NVRAM 140 and that past correction data, which has been obtained before the current calibration and which is stored in the control memory 141, were overwritten with new correction data when the current calibration is performed. In this comparative example, past correction data may no longer be stored in the control memory 141, preventing the user from returning to past satisfactory printing results.

In another comparative example, it is conceivable to store in the backup memory 142 all of the sets of correction data that have been used past, in order to enable a user to select correction data that achieved suitable printing results from the many entries of correction data and to restore the past suitable value back to the control memory 141. However, to implement this process, a large storage area will be required, thereby increasing the cost of manufacturing the printer 1. Further, if numerous entries of correction data were stored in the storage area 142, it will be difficult for the user to determine which correction data was most satisfactory when attempting to revert to this correction data.

Contrarily, according to the present embodiment, since the control memory 141 need only be an area large enough to hold a single set of correction data H and the backup memory 142 also need only be an area large enough to hold a single set of correction data R, the printer 1 can be configured with the NVRAM 140 having a small storage capacity.

Additionally, according to the present embodiment, only a set of correction data R is stored in the backup memory 142. The correction data R is confirmed as proven correction data that has produced printing results with which the user is largely satisfied, and the user has considered it unnecessary to perform calibration to generate new correction data H until the number of printed pages with using the correction data H has exceeded the reference value. By inputting a restore command, the user can return the proven correction data R to the control memory 141 to use this correction data R as correction data H, for forming images. Hence, in cases such as when the user is not satisfied with image-forming results after calibration, the user can restore the proven correction data R to be used for forming images, without becoming confused in selecting past correction data, and can thereby form largely satisfactory images.

<First Modification>

In the above-described embodiment, the laser printer 1 receives, as image data, density data indicative of density of images in a range of 0% to 100% for each color. Accordingly, the laser printer 1 generates correction data H for correcting the density data. However, the laser printer 1 may be modified to receive, as image data, tone data indicative of halftone of images in a range of 0 to 255, for example, for each color. The tone data indicates gradation (changes in tone from darkest to lightest). During the printing operation, the control unit 100 converts the tone data of 0-255 into an exposure signal through another predetermined conversion process. In this case, the correction data H is generated for correcting tone data to correct gradation characteristics of the laser printer 1 for each color. During the calibration process, the control unit 100 generates tone data of 51, 102, 125, 176, and 255, for example, for each color, to print out the test pattern 91. As indicated in parenthesis in FIG. 4(*b*), the control unit 100 determines a measurement curve M based on the measurement results, and determines a correction curve D based on the measurement curve D and based on the ideal curve I. As indicated in parenthesis in FIG. 4(*c*), The control unit 100 determines the correction data H based on the correction curve D, and stores the correction data H in the control memory 141. The control unit 100 copies the correction data H into the backup memory 142 as proven correction data R when the correction data H is proven as satisfactory. It is noted that also in this modification, each of the memories 141 and 142 has a memory area of an amount that is capable of storing one set of correction data H, which includes coefficient values for all the target tones of 0 to 255.

<Second Modification>

The reference number of sheets B need not be a fixed value. The printing performance with the correction data H may be saved, and the contents of the backup memory 142 may be updated when this printing performance is exceeded. Specifically, as indicated by the dotted line in FIG. 2, a performance backup memory 144 may be provided for saving the printing performance in the NVRAM 140.

Figure 5:
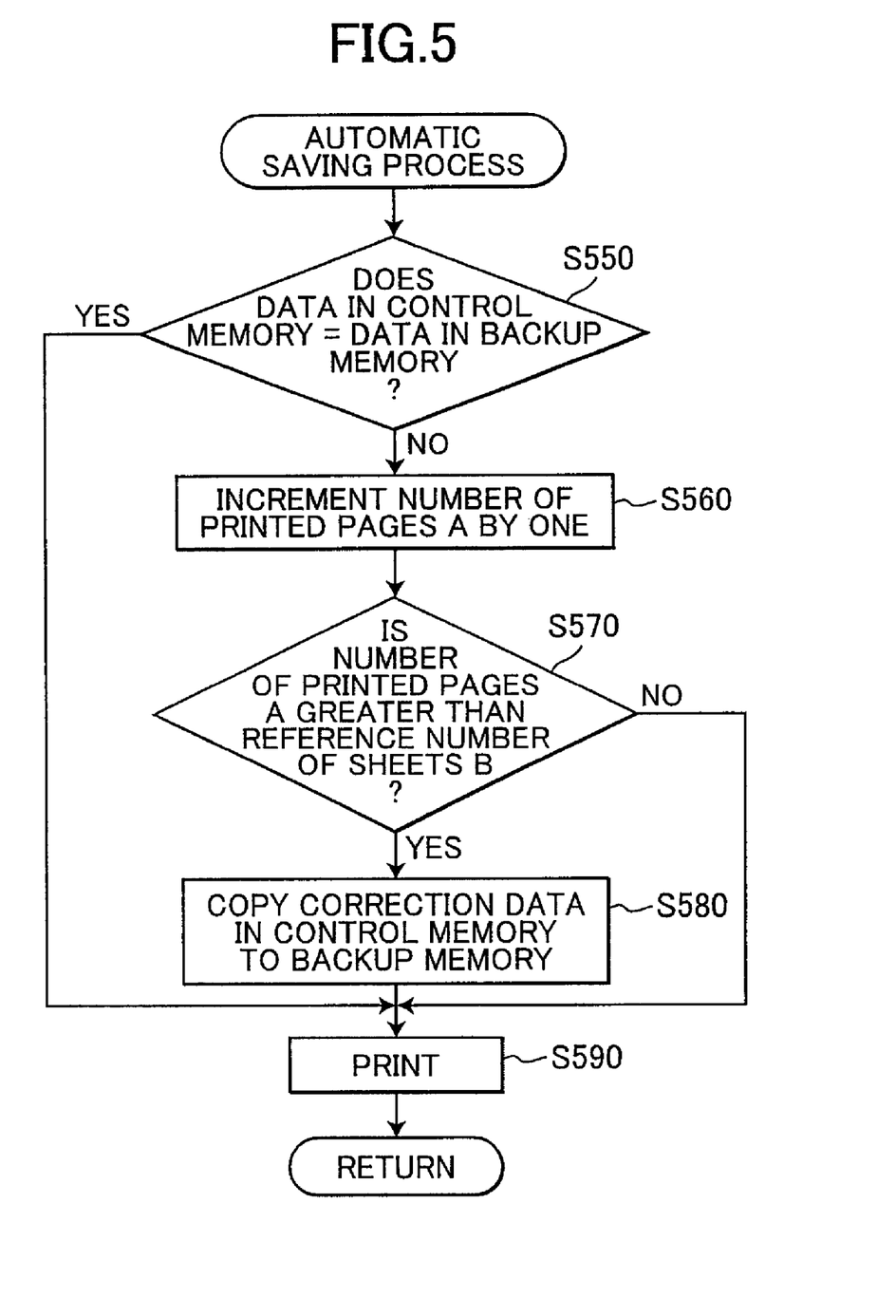
FIG. 5 is a flowchart showing steps in an automatic saving process according to the preferred embodiment.
Figure 7:
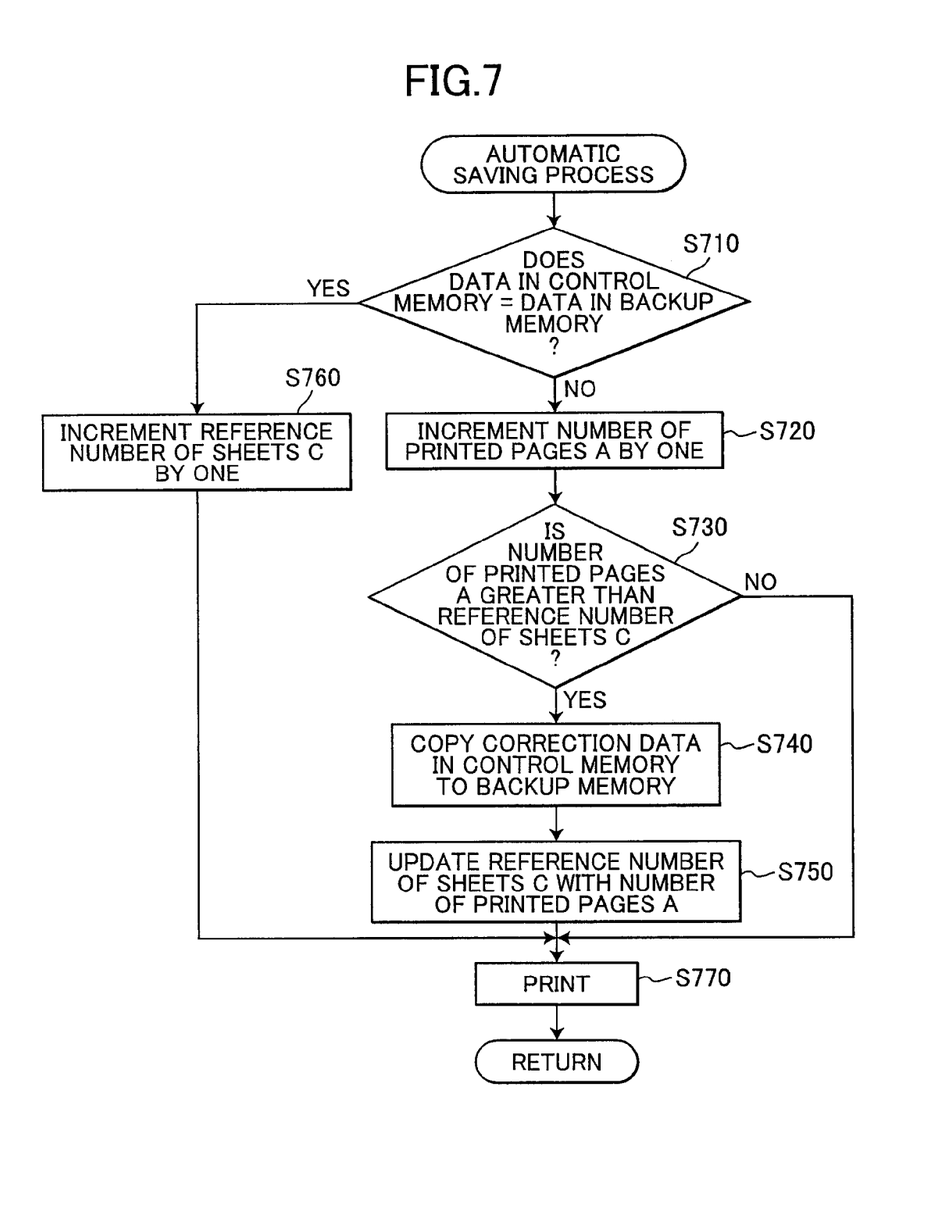
FIG. 7 is a flowchart showing steps in an automatic saving process according to a second modification.

According to this modification, the automatic saving process of FIG. 5 is modified as shown in FIG. 7. The automatic saving process of FIG. 7 is performed also each time when printing one sheet worth of density data which is inputted from the personal computer 50.

In S710 the control unit 100 determines whether the correction data H stored in the control memory 141 matches the correction data R stored in the backup memory 142 in the same manner as described above in S550.

If the correction data H does not match the correction data R (S710: NO), in S720 the number of printed pages A is incremented by one.

In S730 the control unit 100 determines whether the value of the number of printed pages A is greater than a reference number of sheets C stored in the performance backup memory 144.

If the number of printed pages A is greater than the reference number of sheets C (S730; YES), it is known that the number of printed pages A is the new maximum number of sheets. In other words, it is known that the number of sheets that have been printed by using the presently-being-used correction data H is the maximum among the numbers of sheets that have been printed so far by using other correction data H that were used prior to the presently-being-used correction data H. It is known that the presently-being-used correction data H is proved as the most satisfactory correction data among the already-used correction data.

Accordingly, in S740 the control unit 100 copies the value of the correction data H presently stored in the control memory 141 to the backup memory 142.

In S750 the control unit 100 updates the reference number of sheets C to the number of printed pages A, as the new maximum number of sheets Thus, the reference number of sheets C is updated.

In S770 the control unit 100 performs the printing operation by using the correction data H that is presently being stored in the control memory 141.

However, if the control unit 100 determines in S730 that the number of printed pages A is less than or equal to the reference number of sheets C (S730: NO), then the control unit 100 skips S740 and S750 and performs the printing operation in S770 by using the correction data H that is presently being stored in the control memory 141.

Subsequently the process ends.

Further, if the control unit 100 determines in S710 that the correction data H matches the correction data R (S710: YES), then in S760 the control unit 100 increments the reference number of sheets C by one, and in S770 performs the printing operation by using the correction data H that is presently being stored in the control memory 141.

In this way, the most proven correction data H of all correction data used thus far can always be kept as correction data R in the backup memory 142. This ensures that correction data R that is proven as most satisfactory so far is always stored in the backup memory 142 and can be restored in the control memory 141 for forming images.

It is noted that steps S710 and S760 may be excluded from the flowchart in FIG. 7.

Thus, according to the present modification, the most proven correction data R among correction data used thus far is stored in the backup memory 142, enabling the user to revert to correction data thought to be the best thus far.

<Third Modification>

The printer 1 of the above-described embodiment is configured to perform a process for storing the contents of the control memory 141 in the backup memory 142 when the number of printed pages A indicating the number of images formed after calibration is determined to exceed the reference number of sheets B. However, in place of the number of printed pages A, the printer 1 may instead monitor any state after calibration that represents a performance record for a certain calibration, such as the number of print jobs or the amount of operating time. This is because the presently-being-used correction data H, which has been obtained through certain calibration process, is proven as satisfactory or not by monitoring how long or how many print jobs the correction data H has been used until the user instructs his/her "Calibrate" command next. However, the number of printed sheets used in the above-described embodiment directly represents a performance record of image formation, making the correction data R practical, proven correction data.

<Fourth Modification>

Figure 8:
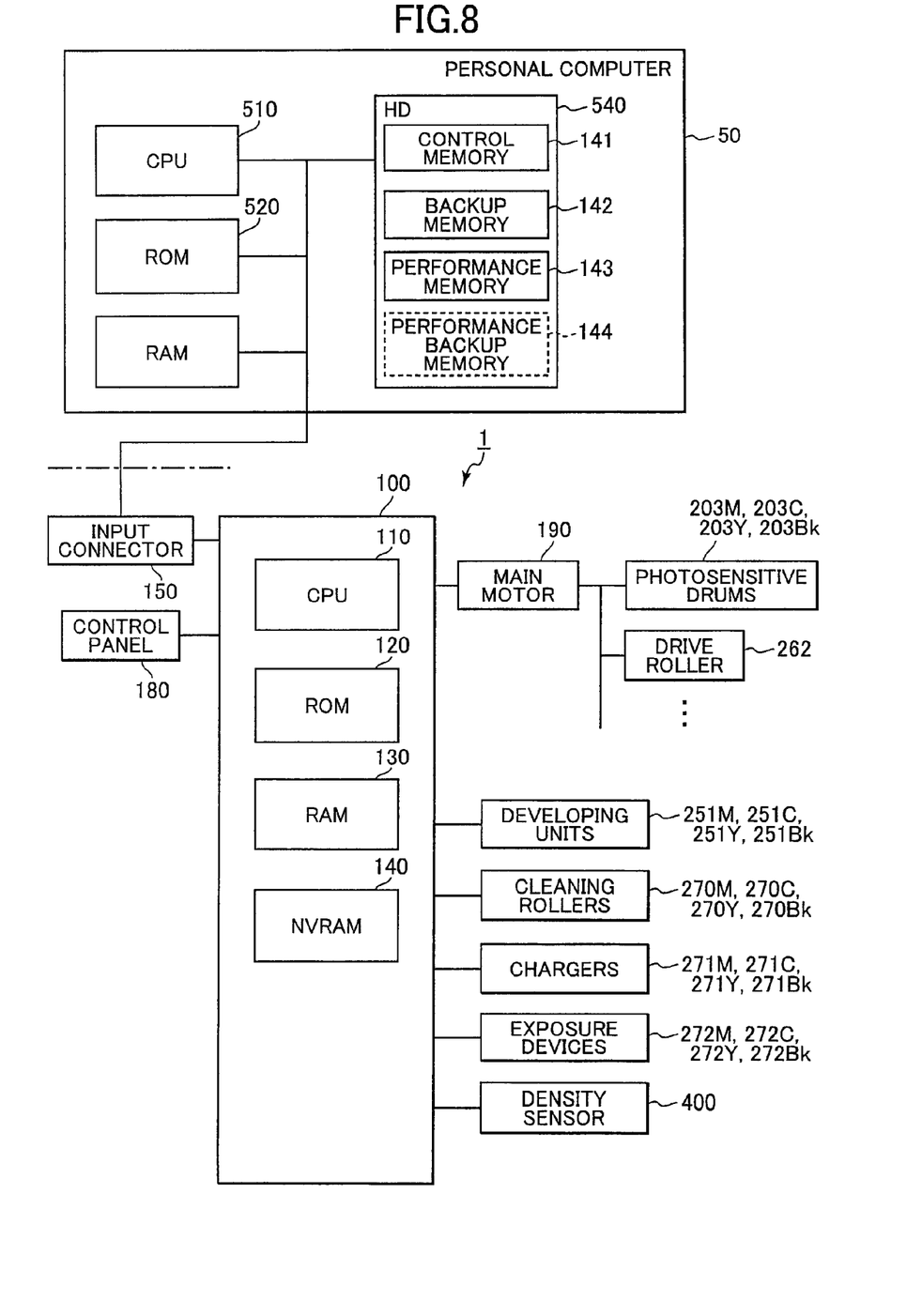
FIG. 8 is a block diagram showing the structure of a printing system according to a fourth modification.

While the printer 1 of the above-described embodiment is configured to store the correction data H and the correction-data R in the NVRAM 140 provided in the control unit 100, an image-forming system may be configured for storing the correction data H and the correction data R on the personal computer 50 side as shown in FIG. 8.

More specifically, according to the present modification, the control memory 141, the backup memory 142, the performance memory 143, and the performance backup memory 144 are prepared in a hard disk 540 provided in the personal computer 50. Instead of using the hard disk 540, an NVRAM may be provided in the personal computer 50 to prepare the memories 141, 142, 143, and 144 therein.

Figure 3:
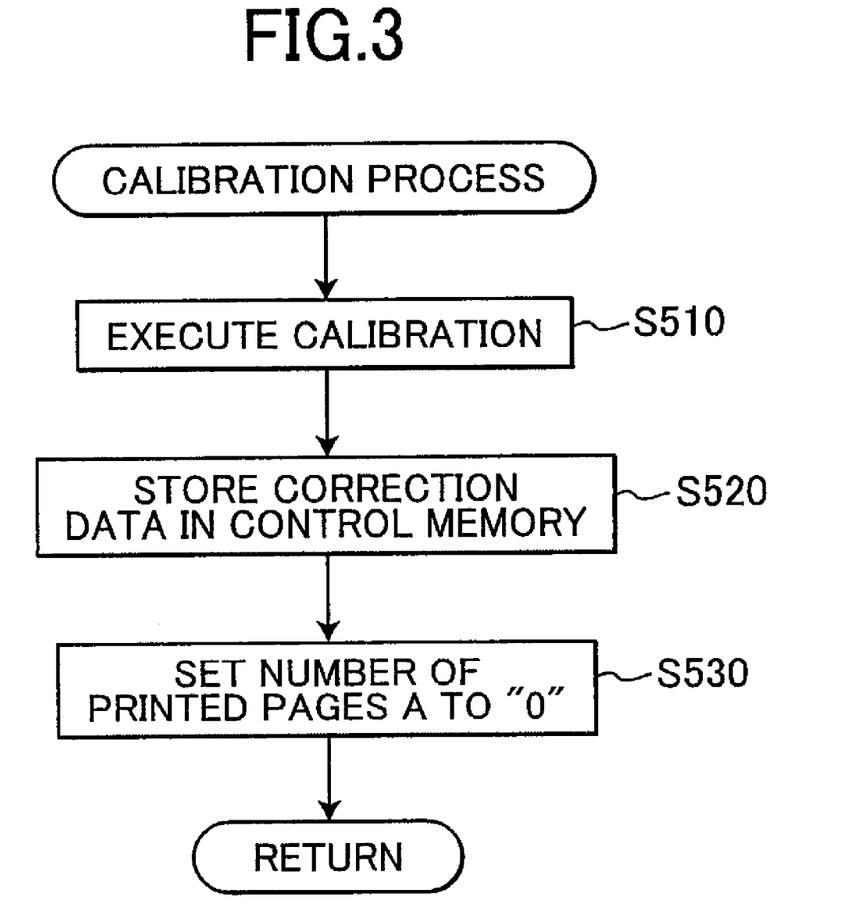
FIG. 3 is a flowchart showing steps in a calibration process according to the preferred embodiment.
Figure 6A:
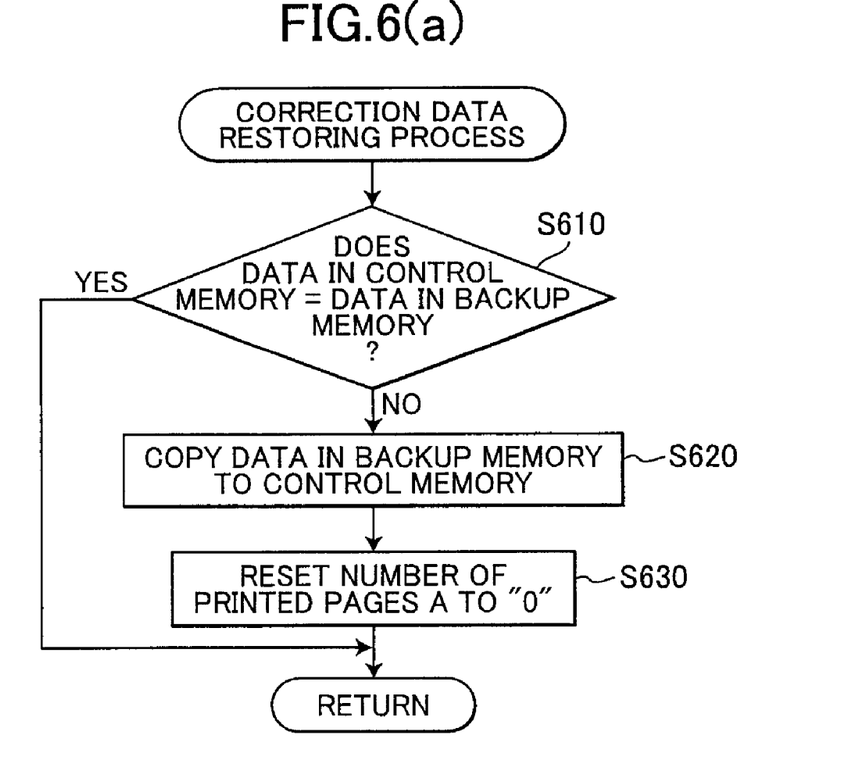
FIG. 6(a) is a flowchart showing steps in a process to restore correction data in response to a user command according to the preferred embodiment.
Figure 6B:
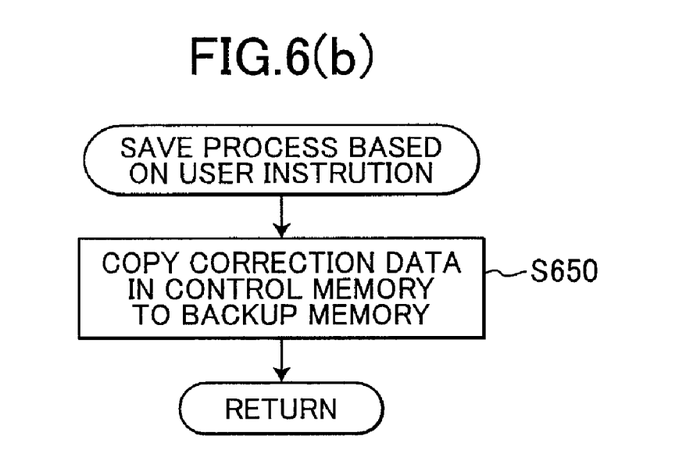
FIG. 6(b) is a flowchart showing steps in a process to save correction data in response to a user-command according to the preferred embodiment.

The programs of the calibration process of FIG. 3, the automatic saving process of FIG. 5 or FIG. 7, the restoring process of FIG. 6(a), and the user-instruction-based backup process of FIG. 6(b) are stored in a ROM 520 in the personal computer side 50. A CPU 510 in the personal computer 50 executes the automatic saving-process of FIG. 5 or FIG. 7, the restoring process of FIG. 6(a), and the user-instruction-based backup process of FIG. 6(b) by controlling the printer 1.

With this construction, the correction data H and correction data R can be managed by each application program used on the personal computer 50. Correction can be performed according to each application program.

Further, this image-forming system may be configured so that "Calibration" and other commands are inputted from the personal computer 50.

While the invention has been described in detail with reference to the specific embodiment thereof, it would be apparent to those skilled in the art that various changes and modifications may be made therein without departing from the spirit of the invention.

For example, while the above-described embodiment is directed to the color laser printer 1, the embodiment may be modified to other image forming devices, such as an inkjet printer or copier, that correct printing density or other printing characteristics and that update the correction data.

In the above-described embodiment, the control memory 141 and backup memory 142 are configured of a single storage device, namely, the NVRAM 140. However, two separate NVRA s 140 may be provided to store data for the control memory 141 and backup memory 142 separately.

Further, the backup memory 142 may store not only the proven correction data R but also several sets of correction data H that have been set in the control memory 141 latest prior to the presently-being-set correction data H. Each set of the several sets of latest correction data H may have been proved as satisfactory or not. With this configuration, not only the proven correction data R but also the recently-set correction data H can be restored in the control memory 141. In this modification, the backup memory 142 is modified to have such an area of an amount that can hold the latest several sets of correction data H and the one set of proven correction data R.

Further, the backup memory 142 may be configured of a hard disk drive or the like. However, by providing storage areas 141 and 142 in nonvolatile memory such as the NVRAM 140, as in the above-described embodiment, the entire device can be easily configured, and it is possible to store the correction data R without losing data when the power to the printer 1 is turned off, contrary to the case where data were stored in the RAM 130.

What is claimed is:

1. An image-forming device, comprising:
an image-forming portion that forms images based on image data on a recording medium;
a memory having a storage area and a backup storage area;
a correction data generating portion that generates, upon receipt of a calibrate command, a set of correction data based on printing density formed by the image-forming portion based on the image data and writes the generated set of correction data in the storage area, the set of correction data corresponding to printing characteristics of the image-forming portion;
a printing control portion that performs image-forming operation to correct image data, indicative of an image desired to be formed, based on the set of correction data stored in the storage area and to control the image-forming portion to form the desired image on the recording medium based on the corrected image data;

a monitoring portion that monitors a performance value, indicative of a degree of performance with which the printing control portion executes its image-forming operation by using the correction data stored in the storage area, the monitoring portion monitoring, as the performance value, the number of printed pages, onto which the image-forming portion performs its image-forming operation by using the correction data stored in the storage area;

a backup storage portion that automatically writes the set of correction data stored in the storage area into the backup storage area only when the performance value monitored by the monitoring portion exceeds a reference performance value; and a restoring portion that restores, in response to a restore command, the set of correction data that is stored in the backup storage area back into the storage area.

2. The image-forming device according to claim 1, wherein the storage area has an area capable of storing one set of correction data, wherein the correction data generating portion writes a copy of the generated set of correction data over another set of correction data that is already stored in the storage area, thereby updating correction data stored in the storage area, and wherein the restoring portion writes a copy of the set of correction data that is stored in the backup storage area over another set of correction data that is already stored in the storage area, thereby updating correction data stored in the storage area.

3. The image-forming device according to claim 1, wherein the backup storage area has an area capable of storing one set of correction data, and wherein the backup storage portion writes a copy of the set of correction data stored in the storage area over another set of correction data that is already stored in the backup storage area, thereby updating correction data stored in the backup storage area.

4. The image-forming device according to claim 1, wherein the reference performance value has a fixed value.

5. The image-forming device according to claim 1, wherein the memory further has another storage area that stores the reference performance value, and wherein when the performance value monitored by the monitoring portion exceeds the reference performance value, the backup storage portion stores the correction data that is stored in the storage area into the backup storage area and changes the reference performance value into another value that is equal to the performance value.

6. The image-forming device according to claim 1, wherein the monitoring portion includes a counting portion that counts up, as the performance value, the number of printed pages, onto which the image-forming portion performs its image-forming operation by using the correction data stored in the storage area until either one of the correction data generating portion and the restoring portion changes the correction data.

7. The image-forming device according to claim 1, further comprising another backup storage portion that writes, in response to an update command, the set of correction data that is stored in the storage area into the backup storage area.

8. The image-forming device according to claim 7, wherein the backup storage area has an area capable of storing one set of correction data, and wherein the another backup storage portion writes a copy of the correction data stored in the storage area over another set of correction data that is already stored in the backup storage area.

9. The image-forming device according to claim 1, wherein the image data includes density data indicative of printing density desired to be formed on the recording medium.

10. The image-forming device according to claim 1, wherein the image data includes tone data indicative of tone desired to be formed on the recording medium.

11. The image-forming device according to claim 1, further comprising a command issuing portion that enables a user to input his/her desired instruction, the command issuing portion issuing the calibrate command upon receipt of the user's instruction to generate correction data, and issuing the restore command upon receipt of the user's instruction to restore the correction data stored in the backup storage area back into the storage area.

12. The image-forming device according to claim 7, further comprising a command issuing portion that enables a user to input his/her desired instruction, the command issuing portion issuing the calibrate command upon receipt of the user's instruction to generate correction data, issuing the restore command upon receipt of the user's instruction to restore the correction data stored in the backup storage area back into the storage area, and issuing the update command upon receipt of the user's instruction to write the correction data stored in the storage area into the backup storage area.

13. The image-forming device according to claim 1, wherein the memory includes a nonvolatile memory.

14. An image-forming system, comprising:

an image-forming device that includes an image-forming portion that forms images based on image data on a recording medium;

a memory having a storage area and a backup storage area;

a correction data generating portion that generates, upon receipt of a calibrate command, a set of correction data based on printing density formed by the image-forming portion based on the image data and writes the generated set of correction data in the storage area, the set of correction data corresponding to printing characteristics of the image-forming portion in the image-forming device;

a printing control portion that performs image-forming operation to correct image data, indicative of an image desired to be formed, based on the set of correction data stored in the storage area and to control the image-forming portion in the image-forming device to form the desired image on the recording medium based on the corrected image data;

a monitoring portion that monitors a performance value, indicative of a degree of performance with which the printing control portion executes its image-forming operation by using the correction data stored in the storage area, the monitoring portion monitoring, as the performance value, the number of printed pages, onto which the image-forming portion performs its image-forming operation by using the correction data stored in the storage area;

a backup storage portion that automatically writes the set of correction data stored in the storage area into the backup storage area only when the performance value monitored by the monitoring portion exceeds a reference performance value; and a restoring portion that restores, in response to a restore command, the set of correction data that is stored in the backup storage area back into the storage area.

15. A method of updating correction data used for correcting image data, based on which an image-forming device forms images on a recording medium, the method comprising:
  generating, upon receipt of a calibrate command, a set of correction data based on printing density formed by an image-forming device based on image data, the set of correction data corresponding to printing characteristics of the image-forming device;
  writing the generated set of correction data in a storage area;
  performing image-forming operation to correct image data, indicative of an image desired to be formed, based on the set of correction data stored in the storage area and to control the image-forming device to form the desired image on the recording medium based on the corrected image data;
  monitoring, as a performance value indicative of a degree of performance with which the image-forming device performs its image-forming operation by using the correction data stored in the storage area, the number of printed pages, onto which the image-forming device performs its image-forming operation by using the correction data stored in the storage area;
  writing automatically the set of correction data stored in the storage area into a backup storage area other than the storage area only when the monitored performance value exceeds a reference performance value; and
  restoring, in response to a restore command, the set of correction data that is stored in the backup storage area back into the storage area.

16. A computer readable medium encoded with instructions capable of being executed by a computer for updating correction data used for correcting image data, based on which an image-forming device forms images on a recording medium, the instructions including instructions for:
  generating, upon receipt of a calibrate command, a set of correction data based on printing density formed by an image-forming device based on image data, the set of correction data corresponding to printing characteristics of the image-forming device;
  writing the generated set of correction data in a storage area;
  performing image-forming operation to correct image data, indicative of an image desired to be formed, based on the set of correction data stored in the storage area and to control the image-forming device to form the desired image on the recording medium based on the corrected image data;
  monitoring, as a performance value indicative of a degree of performance with which the image-forming device executes its image-forming operation by using the correction data stored in the storage area, the number of printed pages, onto which the image-forming device performs its image-forming operation by using the correction data stored in the storage area;
  writing automatically the set of correction data stored in the storage area into a backup storage area other than the storage area only when the monitored performance value exceeds a reference performance value; and
  restoring, in response to a restore command, the set of correction data that is stored in the backup storage area back into the storage area.

17. The image-forming system according to claim 14, further comprising another backup storage portion that writes, in response to an update command, the set of correction data that is stored in the storage area into the backup storage area.

18. The method according to claim 15, further comprising writing, in response to an update command, the set of correction data that is stored in the storage area into the backup storage area.

19. The computer readable medium according to claim 16, the instructions further include instructions for writing, in response to an update command, the set of correction data that is stored in the storage area into the backup storage area.

* * * * *